D. G. & J. A. SHREEVE.
HAY GATHERER AND LOADER.
APPLICATION FILED APR. 10, 1908.

903,329.

Patented Nov. 10, 1908.
2 SHEETS—SHEET 2.

Witnesses

Inventors
David G. Shreeve
Joseph A. Shreeve

By C. A. Snow & Co
Attorneys

UNITED STATES PATENT OFFICE.

DAVID G. SHREEVE AND JOSEPH A. SHREEVE, OF UNION CITY, INDIANA.

HAY GATHERER AND LOADER.

No. 903,329.  Specification of Letters Patent.  Patented Nov. 10, 1908.

Application filed April 10, 1908. Serial No. 426,353.

*To all whom it may concern:*

Be it known that we, DAVID G. SHREEVE and JOSEPH A. SHREEVE, citizens of the United States, residing at Union City, in the county of Randolph, State of Indiana, have invented a new and useful Hay Gatherer and Loader, of which the following is a specification.

This invention has relation to hay gatherers and loaders and it consists in the novel construction and arrangement of its parts as hereinafter shown and described.

The object of the invention is to provide a device of the character indicated which may be attached to a wagon or other moving vehicle and which is adapted to collect the hay as it moves over the surface of the ground and transmit the same into the body of the said vehicle.

With this object in view the device embodies a rotating drum provided upon its periphery with a series or several series of impaling tines which are adapted to engage the hay as it lies upon the ground. Adjacent the said drum is located an elevator which is provided with a series of reciprocating bars having a series of tines that are adapted to engage the hay as it is delivered from the said drum and carry the same up and deposit it upon a platform from whence it is permitted to fall into the body of the vehicle. The elevator is mounted upon a wheel supported axle which is operatively connected with the moving parts of the device. A yoke is pivotally connected to said axle and the said drum is journaled for rotation in said yoke, caster wheels support the rear end portion of the yoke. The forward portion of the elevator is provided with a stub tongue which is adapted to be connected with the running gear or other suitable parts of the vehicle into which the hay is to be deposited. Means are provided for raising or lowering the yoke so that the device may be readily transported from place to place without having the drum in contact with the surface of the ground.

Figure 1:
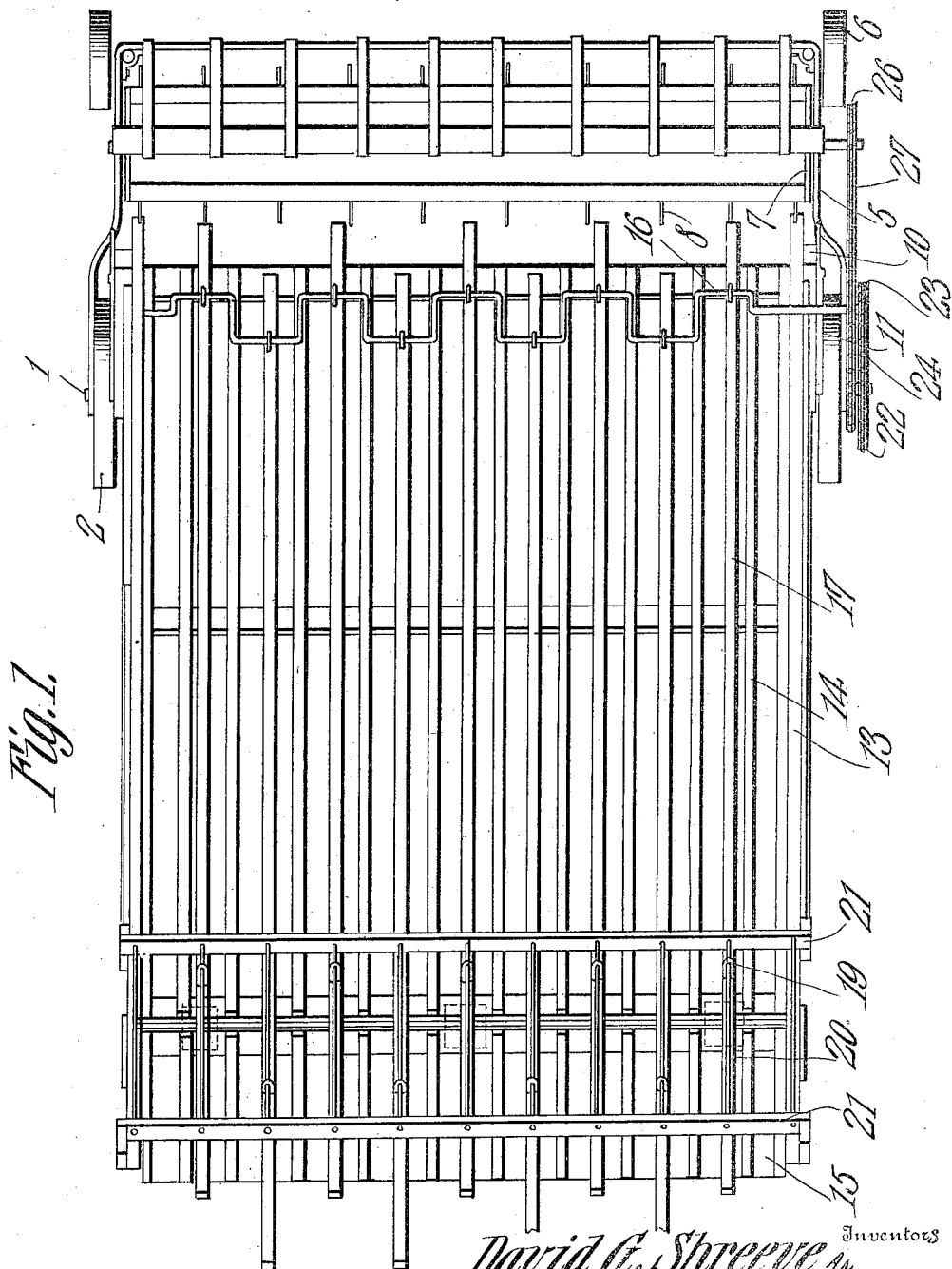
Figure 2:
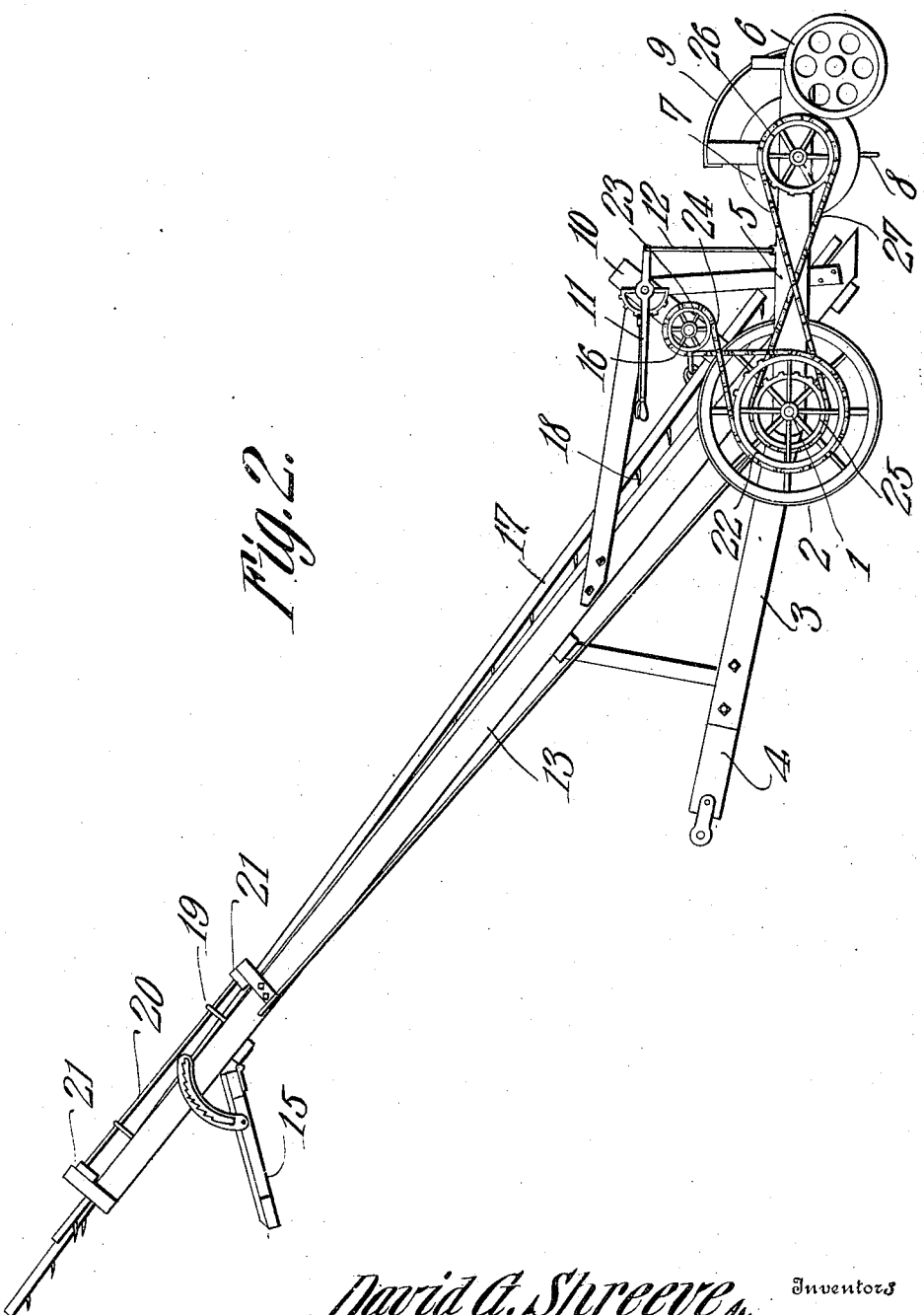

Figure 1 is a top plan view of the gatherer and loader, and Fig. 2 is a side elevation of the same.

The loader consists of the axle 1 which is supported upon the wheels 2. The yoke 3 is connected with the said axle and the tongue 4 is attached to the said yoke. The said tongue may be provided with any suitable device for connection with the running gear of a wagon or other vehicle. The yoke 5 is pivotally connected with axle 1 and the rear portion of said yoke is supported by the freely castered wheels 6. The drum 7 is journaled for rotation in the yoke 5. The said drum is provided upon its periphery with several series of hay impaling tines 8. The rear portion of the drum 7 is protected by the parallel bars 9 which are mounted upon the yoke 5 and curved so as to shield the upper rear portion of the said drum.

The standards 10 are mounted upon the axle 1 and the levers 11 are fulcrumed upon said standards and are connected by means of the rods or flexible members 12 with the yoke 5. By means of the said levers the vertical position of the yoke 5 may be adjusted, that is to say, the said yoke may be so positioned that the drum 7 may engage the ground or it may be elevated to such an extent that the drum 7 will be held above the surface of the ground and out of contact with the same. The elevator 13 is mounted upon the standards 10 and is provided with the slatted bottom 14. The delivery chute 15 is hingedly connected with the upper end portion of the elevator 13 and is adapted to receive the hay from the said elevator and convey the same into the body of a wagon or other vehicle to which the device is attached. The crank shaft 16 is journaled for rotation in the upper end portions of the standards and the parallel bars 17 are pivotally connected with the cranks of the shaft 16 and are adapted to move longitudinally alternately in opposite directions. The said bars 17 are provided with teeth 18 located upon their under sides. The upper end portions of the bars 18 are provided with the eyes 19 which receive the parallel rods 20. The said rods 20 are mounted in the cross pieces 21 which in turn are mounted upon the sides of the elevator 13. The upper ends of the bars 17 extend over the upper surface of the chute 15.

The sprocket wheel 22 is mounted for rotation with one of the ground wheels 2. The sprocket wheel 23 is mounted upon the crank shaft 16, the cross sprocket chain 24 passes around the sprocket wheels 22 and 23 and transmits movement from one of the ground wheels 2 to the crank shaft 16. It will be observed that as the crank shaft 16 rotates the bars 17 will be moved longitudinally and the alternate bars will reciprocate in opposite directions. As the said bars reciprocate the teeth carried by the under side of the same are brought into contact with the hay which is delivered from the drum as will be hereinafter explained and the said hay is carried up the elevator 13 and deposited upon the chute 15 from whence it may fall into the body of the vehicle, as above indicated. The second sprocket wheel 25 is mounted for rotation with one of the wheels 2 and the sprocket wheel 26 is fixed to the shaft of the drum 7. The cross sprocket chain 27 passes around the sprocket wheels 25 and 26. By this arrangement it will be seen that rotary movement is transmitted from the wheel 2 to the shaft of the drum 7 and that as the said drum 7 rotates the tines carried by its periphery impale the hay lying upon the ground and carry the same up and delivers it to the lower end of the elevator 13 at which point the hay is engaged by the teeth of the bars and is carried up along the elevator, as above described.

Having described my invention, what is claimed as new and desired to be secured by Letters Patent is:—

A gatherer and loader comprising a wheel supported axle, an elevator mounted upon the axle, a yoke pivotally connected with the axle, means for raising and lowering said yoke, a drum journaled for rotation in the yoke and carrying impaling tines and means for transmitting movement from the supporting wheel to the drum and elevator.

In testimony that we claim the foregoing as our own, we have hereto affixed our signatures in the presence of two witnesses.

DAVID G. SHREEVE.
JOSEPH A. SHREEVE.

Witnesses:
JAMES B. McREMIE,
SAMUEL P. GLUNT.